US008776163B2

(12) United States Patent
Cirstea et al.

(10) Patent No.: US 8,776,163 B2
(45) Date of Patent: Jul. 8, 2014

(54) HIGH DEFINITION VIDEO EXTENDER AND METHOD

(75) Inventors: Madalin Cirstea, East Lyme, CT (US); Adrian Bica, Twinsburg, OH (US)

(73) Assignee: Video Products, Inc., Aurora, OH (US)

( * ) Notice: Subject to any disclaimer, the term of this patent is extended or adjusted under 35 U.S.C. 154(b) by 11 days.

(21) Appl. No.: 13/079,178

(22) Filed: Apr. 4, 2011

(65) Prior Publication Data

US 2012/0210385 A1 Aug. 16, 2012

Related U.S. Application Data

(63) Continuation-in-part of application No. 13/027,996, filed on Feb. 15, 2011.

(51) Int. Cl.
*H04N 7/173* (2011.01)
*H04N 7/10* (2006.01)

(52) U.S. Cl.
CPC .............. *H04N 7/102* (2013.01); *H04N 7/106* (2013.01)
USPC ........................................... 725/127; 710/65

(58) Field of Classification Search
CPC ............................... H04N 7/102; H04N 7/104
USPC ........................................... 725/127; 710/65
See application file for complete search history.

(56) References Cited

U.S. PATENT DOCUMENTS

| | | | |
|---|---|---|---|
| 6,192,399 B1 * | 2/2001 | Goodman | 725/78 |
| 7,088,398 B1 * | 8/2006 | Wolf et al. | 348/423.1 |
| 7,408,993 B2 * | 8/2008 | Webster | 375/257 |
| 7,672,380 B2 * | 3/2010 | Ho et al. | 375/257 |
| 8,198,999 B2 * | 6/2012 | White et al. | 340/538.15 |
| 8,266,657 B2 * | 9/2012 | Margulis | 725/81 |
| 2006/0036788 A1 * | 2/2006 | Galang et al. | 710/65 |
| 2006/0117371 A1 * | 6/2006 | Margulis | 725/131 |
| 2006/0119701 A1 * | 6/2006 | King | 348/14.08 |
| 2006/0242669 A1 * | 10/2006 | Wogsberg | 725/74 |
| 2007/0103204 A1 * | 5/2007 | Egan et al. | 327/100 |
| 2009/0049498 A1 * | 2/2009 | Li | 725/127 |

(Continued)

OTHER PUBLICATIONS

Evaluation of Differential and Common-Mode Transmission Through UTP Cables USing FE Techniques, Dorai, S. et al., Proceedings of the 56th IWCS. International Wire & Cable Symposium, Nov. 2007.*

(Continued)

*Primary Examiner* — Nasser Goodarzi
*Assistant Examiner* — Michael B Pierorazio
(74) *Attorney, Agent, or Firm* — Taft Stetinius & Hollister LLP; Anthony P. Filomena, II (57) ABSTRACT

An apparatus and method for extending high definition multimedia signals from a source to a display over long distances (e.g., up to 300 feet) using a single cable medium having a plurality of twisted pair conductors contained therein. The extender transparently supports HDMI and/or DVI signaling, which allows encrypted video content to be displayed at the remote display (or other sink device). Display data channel control (DDC) information is sampled and transferred in packet from the local unit to a remote unit to comply with high-bandwidth digital content protection (HDCP).

28 Claims, 8 Drawing Sheets

(56) References Cited

U.S. PATENT DOCUMENTS

| | | | |
|---|---|---|---|
| 2009/0134996 A1* | 5/2009 | White et al. | 340/538 |
| 2010/0043045 A1* | 2/2010 | Shakiba et al. | 725/119 |
| 2010/0104029 A1* | 4/2010 | Lee et al. | 375/257 |
| 2012/0177133 A1* | 7/2012 | Oldenkamp | 375/257 |
| 2012/0183085 A1* | 7/2012 | Hurwitz et al. | 375/258 |
| 2012/0187961 A1* | 7/2012 | Hashim et al. | 324/649 |
| 2012/0187964 A1* | 7/2012 | Michaelis et al. | 324/679 |
| 2012/0188865 A1* | 7/2012 | Michaelis et al. | 370/200 |

OTHER PUBLICATIONS

High-Bandwidth Digital Content Protection System Specification, Revision 1.3, Dec. 2006.*

High-Definition Multimedia Interface Specification, Version 1.3a, Nov. 10, 2006.*

The I2C-Bus Specification, Version 2.1, Jan. 2000.*

* cited by examiner

HIGH DEFINITION VIDEO EXTENDER AND METHOD

RELATED APPLICATION DATA

The present application is a continuation-in-part of prior application Ser. No. 13/027,996, filed on Feb. 15, 2011, which is incorporated herein by reference.

TECHNICAL FIELD OF THE INVENTION

The present invention relates to an apparatus and method for extending high definition multimedia signals from a source to a display over long distances using a single cable medium having a plurality of conductors.

DESCRIPTION OF THE RELATED ART

The digital visual interface (DVI) and the high definition multimedia interface (HDMI) are two common audiovisual standards for transmission of high definition video signals. DVI and HDMI define communication interfaces and protocols that are used to transport audio, video, and management information between audiovisual devices. The DVI or HDMI signals can be communicated via a single multimedia cable having isolated signals from an audiovisual device such as a DVD player, a cable box, etc. to another audiovisual device such as a television and/or display. HDMI and DVI interfaces use TMDS (Transition Minimized Differential Signaling) to send video data from a source to a display. Thus, the video data is generally compatible between the two standards, which means that an HDMI enabled television can display video from a DVI enabled source and vice versa. HDMI, however, additionally encodes digital audio data that cannot be extracted by a DVI display.

For purposes of this application, the remainder of the disclosure will focus primarily on the HDMI interface, but the scope of the claims includes DVI and HDMI signals, unless specifically excluded.

HDMI is a proprietary all-digital audio/video interface capable of transmitting uncompressed video streams. HDMI features generally include the capability to transmit billions of colors, variable high definition screen resolutions and high refresh rates for smooth motions sequences. HDMI also includes multi-channel digital compressed and uncompressed audio. The digital audio and video data transported using HDMI is transmitted electrically using a TMDS interface that is capable of sending high speed data with low noise. HDMI further includes device management control through two separate management buses: the consumer electronics control (CEC) bus and the display data channel (DDC) bus based on part of the inter-integrated circuit ($I^2C$) bus. The DDC bus may be used for product identification and authentication of copyrighted material before the video information is transmitted, while the CEC bus may allow a single remote control module to control multiple HDMI devices within a CEC bus chain. The primary medium used to transmit the HDMI information is copper wires that can drive the HDMI signals for a limited distance. HDMI devices are generally either sources of HDMI data or sinks of HDMI data. HDMI data is generally transferred from a source to a sink.

HDMI is compatible with HDCP (High-bandwidth Digital Content Protection) digital rights management technology. HDMI provides an interface between any compatible digital audio/video source, such as a set-top box, a Blu-ray DVD player, an HD DVD player, a PC, a video game console or an AV receiver and a compatible digital audio and/or video monitor, such as a digital television.

The HDMI interface was developed to transport high-speed digital video signals over relatively short distances using special HDMI cables. As the distance increases, the quality of the video degrades rapidly and the cost of the cable increases dramatically. Transmitting high-definition video over long distances without degrading the quality of the video signals is challenging and important, especially over a shielded or unshielded Ethernet cable, which is widely available and well accepted as a standard communication medium.

SUMMARY

Aspects of the invention relate to an apparatus and method for extending high definition video signals from a source to a display over long distances using a single twisted pair cable.

An extender for extending high definition multimedia signals over a single twisted pair cable medium having a plurality of twisted pair conductors, the extender includes: a local unit having: a first local port for receiving high definition multimedia signals from a high definition video source, wherein the high definition multimedia signals include a plurality of video signals and at least one control signal; a second local port for receiving an associated twisted pair cable medium having a plurality of twisted pair connectors; local circuitry for converting the high definition multimedia signals to a plurality of differential video signals and at least one differential data display channel (DDC) signal, wherein the DDC information includes serial clock and serial data that is sampled and transmitted in packet form at a rate sufficient to comply with high-bandwidth digital content protection (HDCP) and wherein the local circuitry is operable to transmit and receive the DDC information as a differential common mode signal corresponding to at least two of the plurality differential multimedia signals out the second local port over the associated twisted pair cable medium; and a remote unit having: a first remote port for receiving the associated twisted pair cable medium, wherein the remote unit receives the plurality of differential multimedia signals and the differential common mode signal output from the local unit; remote circuitry operable for converting the plurality of differential multimedia signals into separate high definition multimedia signals at the remote unit and converting the differential common mode signal received at the remote unit to provide control information to the remote unit to comply with HDCP; and a second remote port coupled to the circuitry for outputting the high definition multimedia signals to a display device.

Another aspect of the invention relates to a method for extending high definition multimedia signals over a single twisted pair cable medium having a plurality of twisted pair conductors, the method including: receiving a plurality of differential multimedia signals from a source at a local unit, wherein the plurality of differential multimedia signals include a plurality of video signals and a clock signal; transmitting the plurality of differential multimedia signals and data display channel (DDC) information to a remote unit, wherein the DDC information includes serial clock data and serial data that is sampled and transmitted in packet form at a rate sufficient to comply with high-bandwidth digital content protection (HDCP) and the DDC information is transmitted as a differential common mode signal corresponding to at least two of the plurality differential multimedia signals; receiving the plurality of differential multimedia signals and the DDC information at a remote unit; transmitting DDC information from the remote unit to the local unit; outputting the plurality of differential multimedia signals high definition multimedia signals from the remote unit to an associated display based at least in part on the control information.

Other systems, devices, methods, features, and advantages of the present invention will be or become apparent to one having ordinary skill in the art upon examination of the following drawings and detailed description. It is intended that all such additional systems, methods, features, and advantages be included within this description, be within the scope of the present invention, and be protected by the accompanying claims.

It should be emphasized that the term "comprise/comprising" when used in this specification is taken to specify the presence of stated features, integers, steps or components but does not preclude the presence or addition of one or more other features, integers, steps, components or groups thereof."

BRIEF DESCRIPTION OF THE DRAWINGS

The foregoing and other embodiments of the invention are hereinafter discussed with reference to the drawings. The components in the drawings are not necessarily to scale, emphasis instead being placed upon clearly illustrating the principles of the present invention. Likewise, elements and features depicted in one drawing may be combined with elements and features depicted in additional drawings. Moreover, in the drawings, like reference numerals designate corresponding parts throughout the several views.

DETAILED DESCRIPTION OF EMBODIMENTS

In the detailed description that follows, like components have been given the same reference numerals regardless of whether they are shown in different embodiments of the present invention. To illustrate the present invention in a clear and concise manner, the drawings may not necessarily be to scale and certain features may be shown in somewhat schematic form.

Aspects of the invention relate to an apparatus and method for extending high definition multimedia signals from a source to a sink over long distances using a single cable medium having a plurality of twisted pair conductors contained therein. In general, a video (e.g. HDMI, DVI) extender is disclosed that distributes high resolution HDMI or DVI video to a display or other sink device up to a long distance away from the source via a single cable medium (e.g., a Category 5, 5e, 6, 7 cable or the like). Additionally, the extender provides support for digital audio embedded in the HDMI/DVI link, as well as infrared and other non-HDMI/DVI data. The extender 10 transparently supports DDC and HDCP signaling, which allows encrypted video content to be displayed at the remote display (or other sink device). Support for an IR extension provides the ability to control the source while the user is at or near the display, which may be separated from the source a distance of hundreds of feet, as discussed below.

Figure 1:
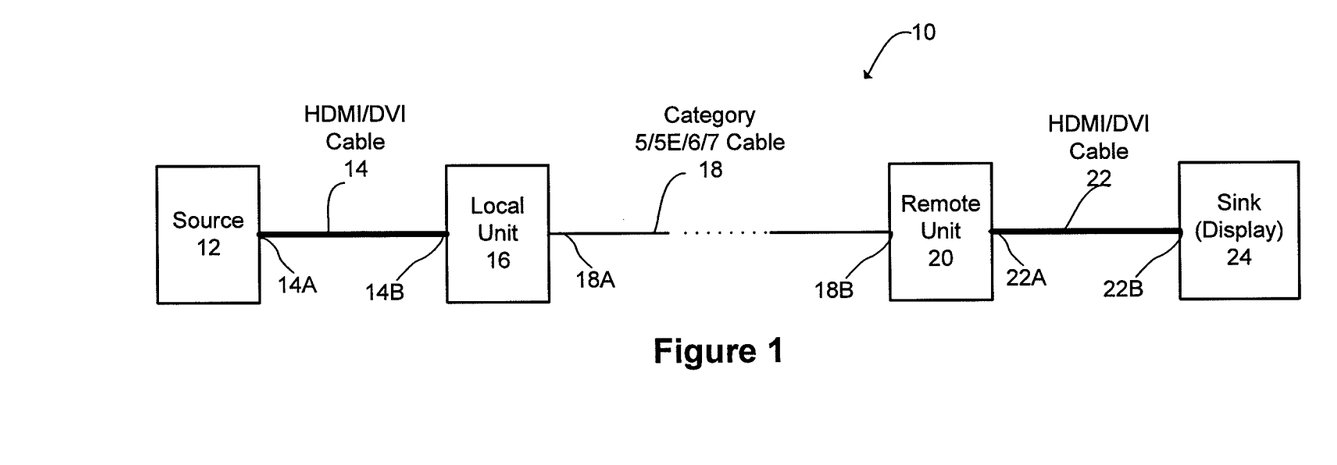
FIG. 1 is an exemplary illustration of a system for extending high definition multimedia signals in accordance with aspects of the present invention.

Referring to FIG. 1, an exemplary system 10 in accordance with aspects of the present invention is illustrated. The exemplary system 10 includes a source of high definition video signals 12, a first coupler 14 for coupling the source 12 to the local unit 16, a cable medium 18 for coupling the local unit 16 to a remote unit 20 and a second coupler 22 for coupling the remote unit 20 to a sink 24. The distance between the local unit 16 and the remote unit 20 may be any desired distance. Due to performance issues, the distance between the local unit 16 and the remote unit 20 is generally less than about 500 feet, and preferably less than about 300 feet. One of ordinary skill in the art will readily appreciate that the distance between the local unit 16 and remote unit 20 is provided for illustrative purposes and not intended to limit the scope of the present invention.

The source of high definition multimedia signals 12 may be any suitable source of high definition multimedia signals. For example, the source 12 may be a DVD player, HD DVD player, Blu-ray player, a cable TV set-top box, a satellite TV set-top box, a computer, etc. The source of high definition multimedia signals may output HDMI and/or DVI compliant signals. Generally, the source 12 will output high definition multimedia signals in the form of four differential signals (three digital video signals and one clock signal).

The first coupler 14 is terminated at a first end 14A to match the expected output from the source 12. The coupler 14 may also be terminated at a second end 14B to match the expected input port 40 of the local unit 16. Generally, the coupler 14 is terminated at the first end and the second end with identical connectors, although the connectors on the first end of the coupler may have a different type, form and/or configuration than the connector on the second end of coupler 14. The coupler 14 may take any desired form. Exemplary couplers 14 may include an HDMI cable or a DVI cable, for example.

Figure 2:
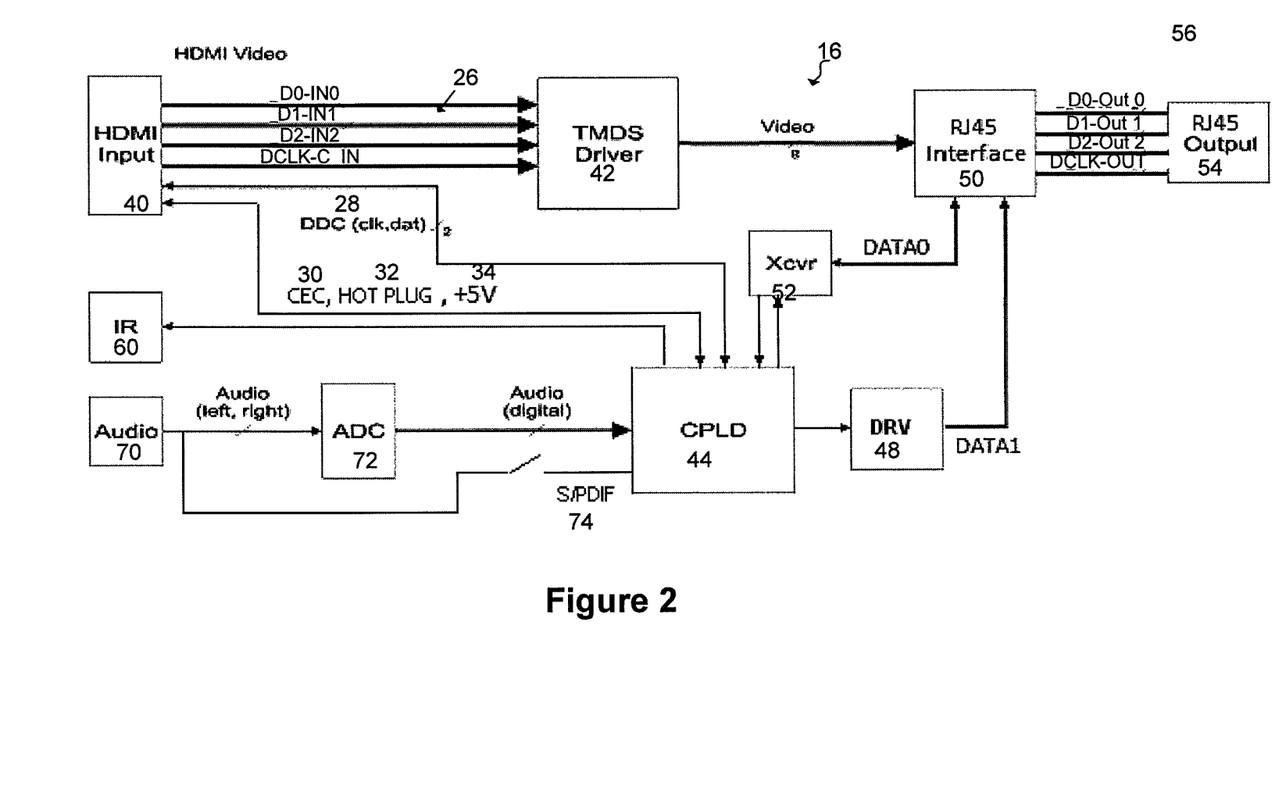
FIG. 2 is a schematic block diagram illustrating an exemplary local unit in accordance with aspects of the present invention.

Referring to FIG. 2, the output of the source 12 includes four transition minimized differential signals (TMDS), which are commonly referred to as D0, D1, D2, DCLK (also referred to herein as multimedia signals 26). The D0, D1 and D2 signals contain data related to video signals and the DCLK signal is a clock signal. A bi-directional display data channel (DDC) signal 28 is also output from the source 12 on coupler 14. As stated above, in HDMI systems, devices can generally be either sinks or sources of data. The DDC signals 28 can be used by an HDMI source (e.g., source 12) to discover the configuration and/or capabilities of a HDMI sink (e.g., display 24). A bi-directional consumer electronic control bus (CEC) signal 30 is also output from the source 12 on coupler 14. The CEC bus 30 provides high-level control functions between HDMI devices. For example, in one embodiment, the CEC bus 30 allows for a single remote control module to control multiple HDMI devices within a CEC bus chain. A +5V signal 34 may also be output from source on coupler 14. This signal may be used to indicate to the sink that a source is connected and powered on. A hot-plug signal may be output from the local unit 16 to the coupler 14. This signal may be used to indicate to the source 12 that the sink 24 is powered on and connected to the remote unit 20 providing that local unit 16 and remote unit 20 are connected via cable 18 and powered on.

The output of the coupler 14 is connected to the local unit 16 at port 40. A schematic block diagram of an exemplary local unit 16 is illustrated in FIG. 2. The TMDS multimedia signals 26 are routed from the port 40 to a driver 42. The driver 42 may be used to modify one or more physical characteristics of the TMDS multimedia signals 26. For example, the output of the driver 42 is source-terminated with a 50 to 100 ohm pull-up resistor (not shown). In addition, the driver 42 offers the ability to add levels of pre-emphasis or de-emphasis as well as input equalization (re-timing) to the TMDS multimedia signals 26. For example, the amplitude of the multimedia signals may be modified and/or a pre-emphasis may be applied to the multimedia signals to increase rise and fall times that are reduced during transmission across long distances. An exemplary driver is the Pericom PI2HDMI412AD, which is manufactured by Pericom Semiconductor Corporation of San Jose, Calif., or EL9131 manufactured by Explore Microelectronics, Taiwan. These drivers are identified for illustrative purposes only. A person having ordinary skill in the art will readily appreciate that any TDMS drivers may be used in accordance with aspects of the invention.

The DDC signal 28 and CEC bus signal 30 are routed from the port 40 to a controller 44. The controller 44 controls general operation of the local unit 16. The controller 44 may be any type of controller suitable for high speed processing of high quality signals. For example, the controller 44 may be a complex programmable logic device (CPLD), ASIC, field programmable gate array, CPU, microcontroller, microprocessor or the like.

The controller 44 is generally operative to perform all of the functionality disclosed herein. For example, the controller 44 is coupled to port 40, driver 48, RJ45 interface 50, transceiver 52 in order to multiplex or otherwise combine the TMDS multimedia signals 26 along with the DDC and CEC control signals 28, 30 to form an output at port 54, as discussed below.

The controller 44 may also monitor the +5V signal 34. The controller 44 selectively makes available the DDC 28 signals (e.g., DDC_SCL and DDC_SDA signals) and CEC 30 signals to transceiver 52. The transceiver 52 receives the DDC 28 and CEC 30 signals and outputs corresponding samples of the DDC and CEC in packet form, as discussed below.

The output of the transceiver 52 is operatively connected to the RJ45 interface 50. A detailed representation of RJ45 interface is presented in FIG. 3.

Figure 3:
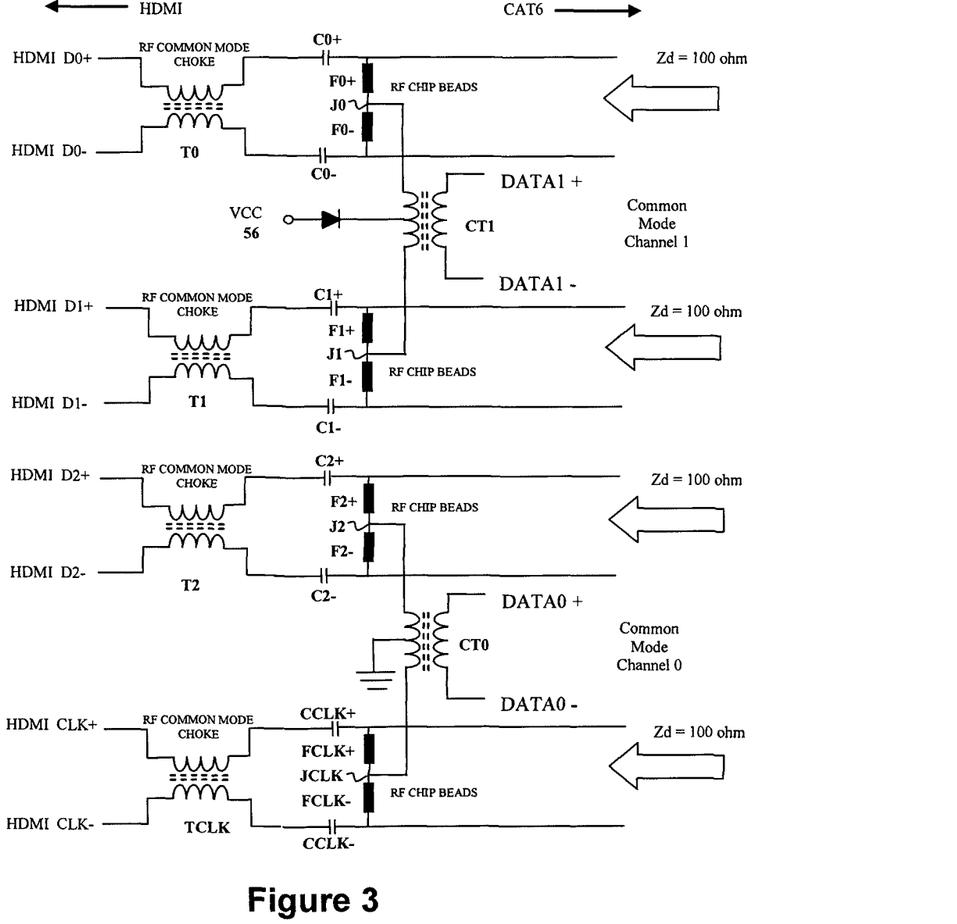
FIG. 3 is a schematic block diagram illustrating the use of common mode voltage to exchange information between the local unit and the remote unit in accordance with aspects of the present invention.

The DDC signal includes a DDC_SCL (standard clock) signal and a DDC_SDA (serial data) signal. Again, samples of the DDC_SCL and DDC_SDA signals are output the transceiver 52 and coupled to the output of the RJ45 interface 50 via the transformer CT0 as seen in FIG. 3. Samples of the DDC_SCL and DDC_SDA signals are transmitted at a sampling frequency sufficiently high to easily recover the data. An exemplary sampling frequency may be 550 KHz, for example.

The DDC_SCL and DDC_SDA may be in the form of single bits that may be transmitted in packet form, for example. The packet also may include additional data. For example, the packet may contain CEC, IR, USB data and/or information and the like. The packet containing DDC_SCL and DDC_SDA may be transmitted on two common mode as differential signals. An additional benefit of the present invention is to allow additional information and/or data to be transmitted over the two additional common mode signals that are available.

Turning next to FIG. 3, a diagram illustrating the use of common mode voltages to transmit digital DDC and CEC signals in packet form is shown. FIG. 3 illustrates the components of the RJ45 Interface 50 that combine signals into common mode signals. With reference to FIG. 3, differential HDMI signals (D0, D1, D2 and CLK) are illustrated from top to bottom respectively. The D0+ signal and the D0− signal have common mode choke T0, ferrites F0+ and F0− coupled to the respective D0+ signal and D0− signal. Likewise, D1+ signal and the D1− signal have common mode choke T1, ferrites F1+ and F1− coupled to the respective D1+ signal and D1− signals. The D2+ signal and the D2− signal have common mode choke T2, ferrites F2+ and F2− coupled to the respective D2+ signal and D2− signal. Finally, the DCLK+ signal and the DCLK− signal have common mode choke TCLK, ferrites FC+ and FC− coupled to the respective DCLK+ signal and DCLK− signal. The juncture J0 between the ferrites F0+ and F0− is coupled to a transformer CT1 with the juncture J1 formed between the ferrites F1+ and F1−. Likewise, the juncture J2 between the ferrites F2+ and F2− is coupled to a transformer CT0 with the juncture JCLK formed between the ferrites FCLK+ and FCLK−. The transformer CT1 and CT0 transformers are operable to transmit differential signals having a bit rate minimum of about 200 kbps and a bit rate maximum of about 24 Mbps, for example. One of ordinary skill in the art will readily appreciate that the values illustrated above are exemplary in nature and not intended to limit the scope of the present invention.

Each transformer CT1 and CT0 is operable to output separate data channels. The remote unit 20 includes substantially the same circuitry as illustrated in FIG. 3, a discussion of which will be omitted for the sake of brevity. The transformers CT1 and CT0 are coupled to the output signals of the RJ45 interface 50 for providing power to the twisted pair cable medium. In one embodiment, the power may be applied to the D0 and D1 signal pairs and GND to D2 and DCLK signal pairs through a center-tapped transformers CT1, CT0 and high frequency ferrites, as discussed below. The ferrites may be chosen to handle the maximum current and to provide enough impedance so that the cable medium may still terminate on approximately 100 Ohms differential impedance, as is conventional. Power can be applied from either end (e.g., the local unit 16 or remote unit 20). For example, the local unit 16 may be coupled to an external power source through a power cord, for example, and provide power to the remote unit 20 through the cable medium 18. Alternatively, the remote unit 20 may be coupled to an external power source through a power cord, for example, and provide power to the local unit 20 through the cable medium 18.

For purposes of illustration, the voltage applied to the cable medium may be 24 VDC to allow for the voltage drop on ferrite resistance and cable medium resistance. A high DC voltage is preferred to minimize these voltage drops by minimizing the DC current that passes through the ferrites and cable. Another possible solution is to use an AC voltage instead of DC voltage.

In one embodiment, the signals output from RJ45 interface 50 may be grouped to form one or more channels. For example, as illustrated in FIG. 2, the D0 and D1 signals form a common mode channel, as they are coupled to the driver 48. Another common mode channel may be formed from D2 and DCLK as they are coupled to the transceiver 52. In one embodiment illustrated in FIG. 2, one channel may be used to send DDC information (DDC_SCL and DDC_SDA), hot plug information, CEC information, infrared information, +5V signals and emulated USB device data. Another channel remains available for any other data not related to the HDMI signals. For example, the second channel may be used to send stereo-audio in the case the extender is used as a DVI extender, RS-232 data, etc.

Figure 4:
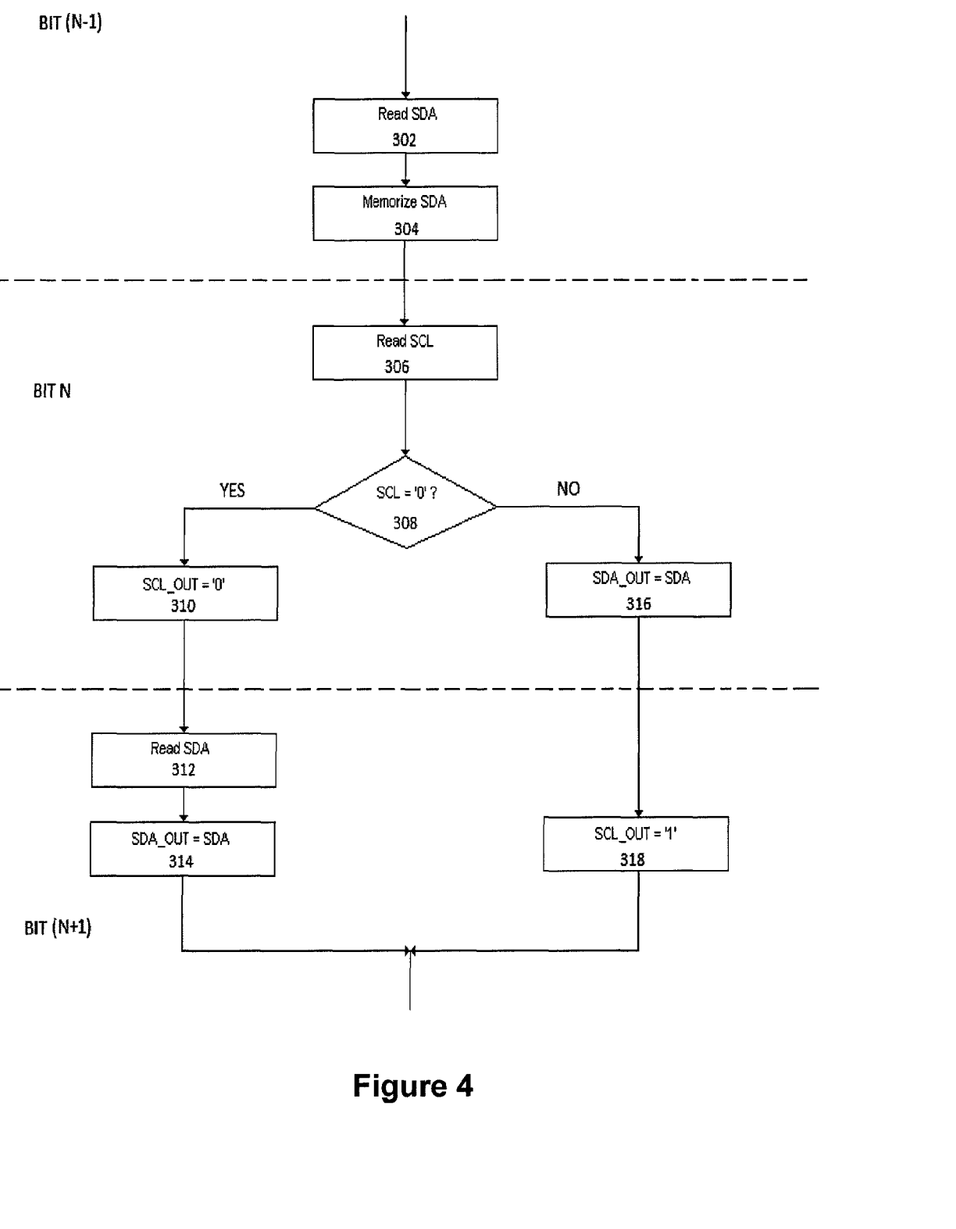
FIG. 4 is an exemplary method for controlling DDC signaling in accordance with aspects of the present invention.

The TDMS multimedia signals and the common mode signals may be output on a single cable medium 18 (shown in FIG. 1), wherein the cable medium 18 has a pair of conductors for each of the plurality of signals. As explained above, samples of the DDC and CEC signals are transmitted in the common mode. The HDMI specification states DDC channel maximum bit rate is 100 Kbp. The maximum bit rate for the channels (e.g., channel 1, channel 2) generally will be determined by the delay in the cable medium. In one aspect of the invention, the extender 10 has been targeted to work with 300 foot of cable medium, which will introduce about 900 nanoseconds in round-trip delay. In order to ensure that DDC_SDA will not change during the time DDC_SCL is high one aspect of the present invention is to transmit two DDC_SDA samples, one before and one after DDC_SCL sampling. As shown in FIG. 4, at the remote unit side 20, the DDC_SDA and DDC_SCL signals are reconstructed in a manner that will assure stable data (e.g., DDC_SDA) while DDC_SCL is high. Thus, the data at the remote unit 20 will be changed only when the received DDC_SCL data is low. This method is presented in FIG. 4.

At Block 302, the sample of DDC_SDA signal is read by remote unit 20.

At Block 304, the DDC_SDA sample read at Block 302 is memorized.

At Block 306, the sample of DDC_SCL is read by remote unit 20.

At Block 308, the remote unit checks if the DDC_SCL signal is low. If yes proceeds to Block 310. If not, Block 316 will be executed.

At Block 310, the remote unit 20 will pull the output DDC_CLK low.

At Block 312, the remote unit 20 reads the second sample of DDC_SDA.

At Block 314, the remote unit 20 outputs the value of sample DDC_SDA on its DDC_SDA output.

At Block 316, the DDC_SDA output is forced to mirror the memorized DDC_SDA value at block 304.

At Block 318, the DDC_CLK output at remote unit 20 is forced to high.

The DDC sampling frequency will be around 550 kHz and the bit frequency will be 20 Mbps. A packet, from local unit 16 will contain a header and samples of DDC_SDA, DDC_SCL, and CEC data as a minimum. Likewise, a packet coming from the remote unit 20 will have a different header with different DDC_SDA, CEC data, HP and/or infrared sample data. Latching free behavior for DDC signals will be assured by not looping back the received low states of DDC_SDA signal. The signal will be converted to differential signals by a high speed single ended to differential amplifier (from the transceiver 52) and injected via a center tapped transformer (CT0) on the common mode of D2 and DCLK pairs. The common mode signal will be extracted at the remote unit 20, amplified and equalized and then converted back to a single ended signal for use by the sink 24.

As set forth above, one aspect of the invention relates to transmitting control signals in the form of display data channel (DDC) signals and Data (digital audio, USB, CEC, Hot Plug and infrared) as differential common mode signals. In general, there will be two data channels, one data channel formed from D2 and CLK pairs and the other data channel formed from D0 and D1 pairs. A person of ordinary skill in the art will readily appreciate that the one or more signal may be carried on any desired channel.

The HDCP engine uses the DDC channel to communicate between the source 12 and the sink 24. The source and sink have to exchange secret encryption keys. These keys are applied to the outgoing and incoming video by the HDCP engines in the source and display, respectively. Once the exchange and handshaking between the two is done, the source begins encrypting the video. Starting with the first encrypted frame sent, the source starts a counter that increments at every frame. The display starts its counter with the first encrypted frame received, and increments it at every subsequent encrypted frame. At a minimum of once every 2 seconds, the source requests the counter value from the display. If the display counter value does not match the source counter value, the encryption process starts over and video is interrupted. This is the reason for which a transparent DDC channel is desired.

The signals converted by the local unit 16 are output the port 54 and are transmitted across cable medium 18 to the remote unit 20. The cable medium 18 is coupled at port 54 through an appropriate connector 18A connected to the cable medium. A suitable connector may be a RJ45 connector connected on both ends (18A and 18B) of the cable medium 18 for connection of the cable medium to the local unit 16 at port 54 and the remote unit 20 at port 100. The signals output from port 54 include four pairs of differential signals. The signals are transmitted using unshielded or shielded Ethernet CAT5, CAT5e, CAT6, CAT7 cable or similar cables that contain at least 4 twisted pairs of conductors. Although disclosed as having RJ45 connectors, one of ordinary skill in the art will appreciate other suitable connectors may be used in accordance with aspects of the present invention.

Signals from port 54 are routed through cable medium 18 to remote unit 20 and received at port 100 through connector 18B. The signals, which have been converted to serial data signals are re-constructed at the remote unit 20 for use by the sink 24. In one embodiment, the connector 18B may be a RJ45 connector.

Figure 5:
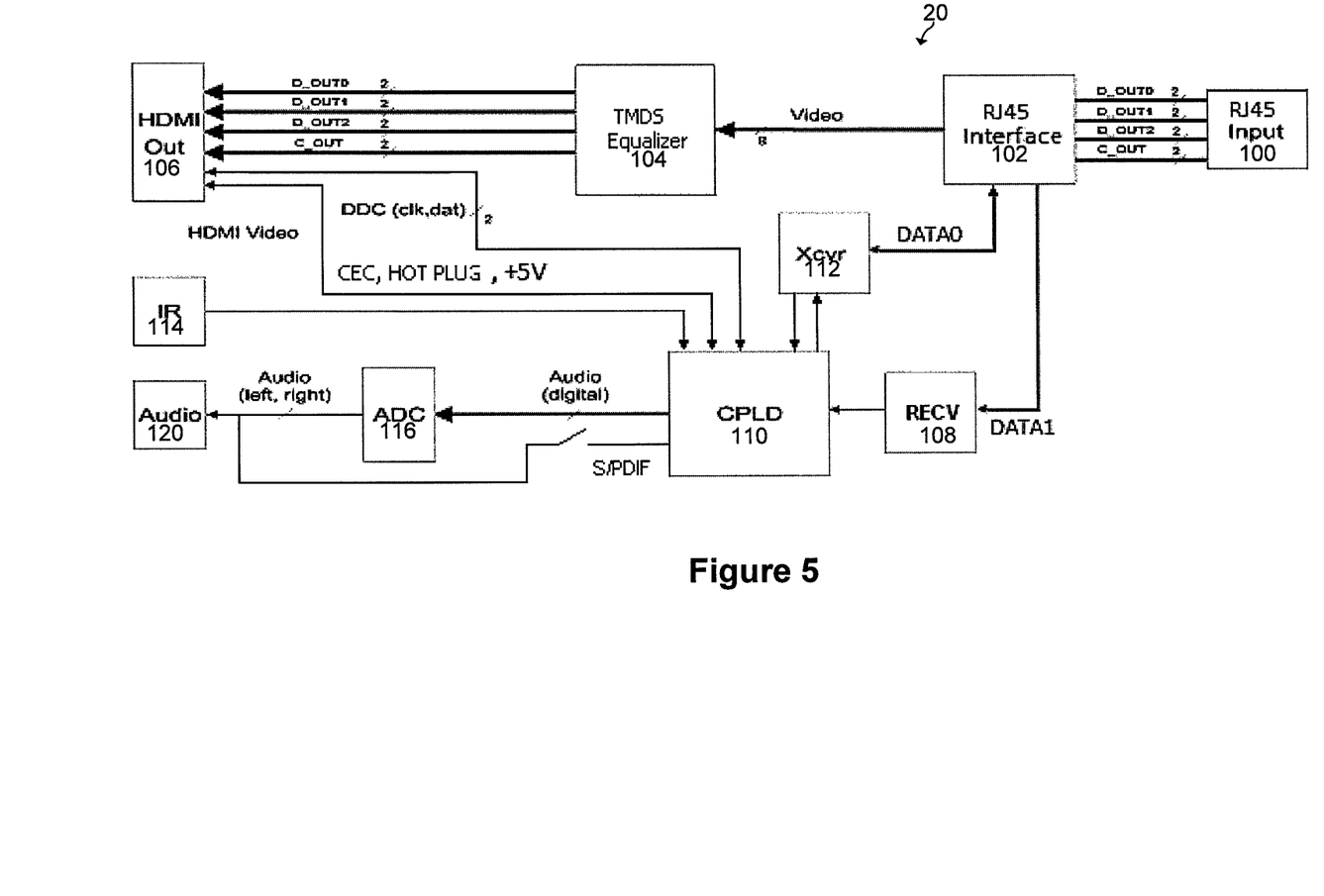
FIG. 5 is a schematic block diagram illustrating an exemplary remote unit in accordance with aspects of the present invention.

Referring to FIG. 5, from port 100 the encoded video signals routed to a coupler 102. The coupler 102 may be an AC coupler, which removes DC bias associated with the received signals. The output of the coupler 102 may be received by a driver 104. The driver 104 may be a TMDS Equalizer. In general, the coupler 102 receives four differential pairs of signals. The output of the driver 104 are high speed differential video signals (e.g., D0, D1, D2 and DCLK, as discussed above for output the port 106 and input into the sink 24 (FIG. 1). One goal is to re-create the signals output from the driver 104 to correspond, as close as possible to the signals 26 output from the source 12.

The common mode signals transmitted through the cable medium are decoded at the receiver 108 and input to the controller 110. The controller 110 may be an identical controller to controller 44, discussed above. Once decoded, the control signals may be routed to the controller 110 and selectively output the port 106 by the controller 110 for use by the sink 24.

From port 106, high definition multimedia signals (e.g., HDMI, DVI signals) are output to a coupler 22. Coupler 22 is connected to the port 106 and the display 24 (or other sink device) to facilitate communication between the source 12 and the display 24. The coupler 22 may be, for example, an HDMI cable, a DVI cable, etc, for connecting the remote unit to the display 24 (or other sink device). The coupler 22 has connectors 22A, 22B that matingly engage with port 106 and/or input associated with the display 24.

As shown in FIG. 5, the remote unit 20 further includes a transceiver 112 for transmitting control data back to the local unit 16 and/or source 12 through the port 100 and cable 18. Like transceiver 52 (discussed above), transceiver 112 converts the single-ended control signals to differential control signals for output to the local unit 16 through cable medium 18. Such mechanism allows for HDPC compliance procedures. Thus, the local unit 16 and the remote unit 20 work together to ensure transparent DDC communication between the source and/or sink.

Since the display 24 may be up to 300 feet away from the source 12, it is desirable to have an infrared receiver 114 coupled to the controller 110 in order to allow the user to control the source 12 while present at or near the sink 24 (e.g., a display). Therefore, the local unit 16 and the remote unit 20 are also operable to exchange infrared signals. Accordingly, the remote unit 20 may optionally include a receiver 114. The receiver 114 may be coupled to the controller 110 and receives signals from a remote control (not shown), for example. As such, the receiver 114 may receive infrared signals that may be encoded on a twisted pair of conductors and routed through the port 100 to the local unit 16 and transmitted to the source 12 in order to control one or more functions of the source 12, in a similar manner as described with respect to the control signals (e.g., through common mode signaling). The receiver 114 may be connected to the remote unit 20 through a 3.5 mm stereo jack or other suitable interface, for example.

For satisfactory end-user results, the receiver 114 should be mounted to the edge of the sink device 24 (e.g., display) with the IR window of the receiver 114 facing the user (the same direction as the display screen). The IR data is transmitted over the common mode of D2 and DCLK, as discussed above with respect to the HDMI signals. Once the IR data has been received at the local unit 16, it is converted by the controller 44 and transmitted out transmitter 60 to the source 12. Based on this relationship the transmitter 60 should be mounted such that the LED of the transmitter is in the direct line of sight of the IR window of the source 12.

Referring back to FIG. 2, optional support for stereo audio allows the user to extend audio from a DVI source to a DVI or HDMI display. Analog stereo audio signal may be received at the local unit 12 from an analog stereo audio source (not shown) at port 70. The user may choose between analog or digital (e.g., S/PDIF) audio signals to be extended. The local unit 12 may sense if digital audio signal are applied and switch to a digital mode, if appropriate. The local unit 12 will also send a control bit to the remote unit 20, so that the remote unit will switch to the digital mode, if appropriate. The stereo audio signal may be converted to a digital signal by an analog to digital (ND) converter 72. The converted data or the digital audio data is then sent to the controller 44 wherein data flow is controlled. The controller 44 selectively outputs the audio data to the driver 48, which converts the single-ended signals to differential signals for output over the channel formed by the common mode corresponding pair of D0 and D1 and output port 54, as illustrated in FIG. 2.

In addition, the controller 44 may send and receive command and control information to and from the controller 110 of the remote unit 20 via one of the two data channels or both.

The remote unit 20 receives the stereo audio signal at the interface 100, after which the stereo audio signal passes to the receiver 108 and controller 110. The controller 110 functions in a manner similar to the data controller 44 and multiplexes/demultiplexes the stereo audio signal, for example. The stereo audio signal is output to the audio port 120 if digital audio is implemented or the stereo audio signal is converted from a digital signal to an analog signal by a digital to analog (D/A) converter 116. After being converted to an analog signal, the stereo audio signal preferably corresponds to the stereo audio signal received by the local unit 102 and is transmitted to a stereo audio device, such as a stereo receiver, with the same voltage as the stereo audio signal received by the local unit 20.

Figure 6:
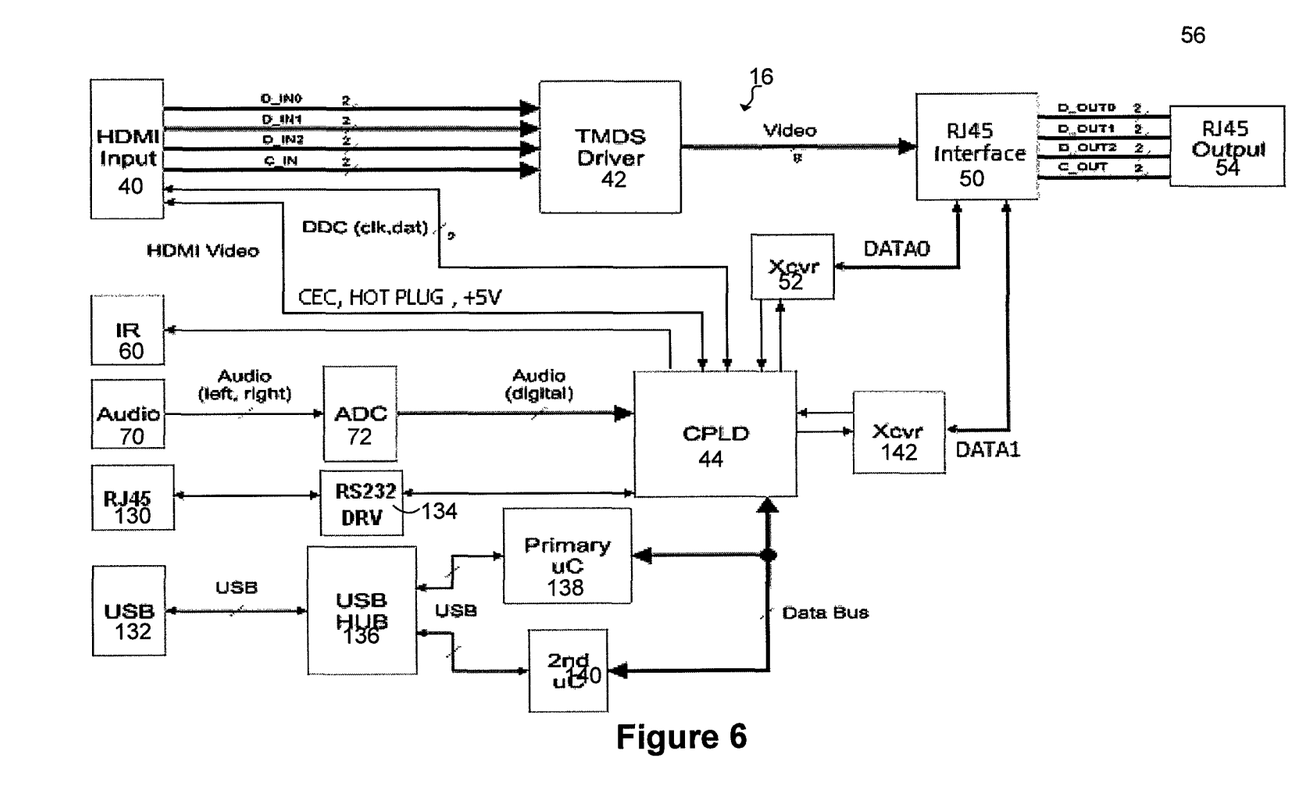
FIG. 6 is a schematic block diagram illustrating a second exemplary local unit in accordance with aspects of the present invention.
Figure 7:
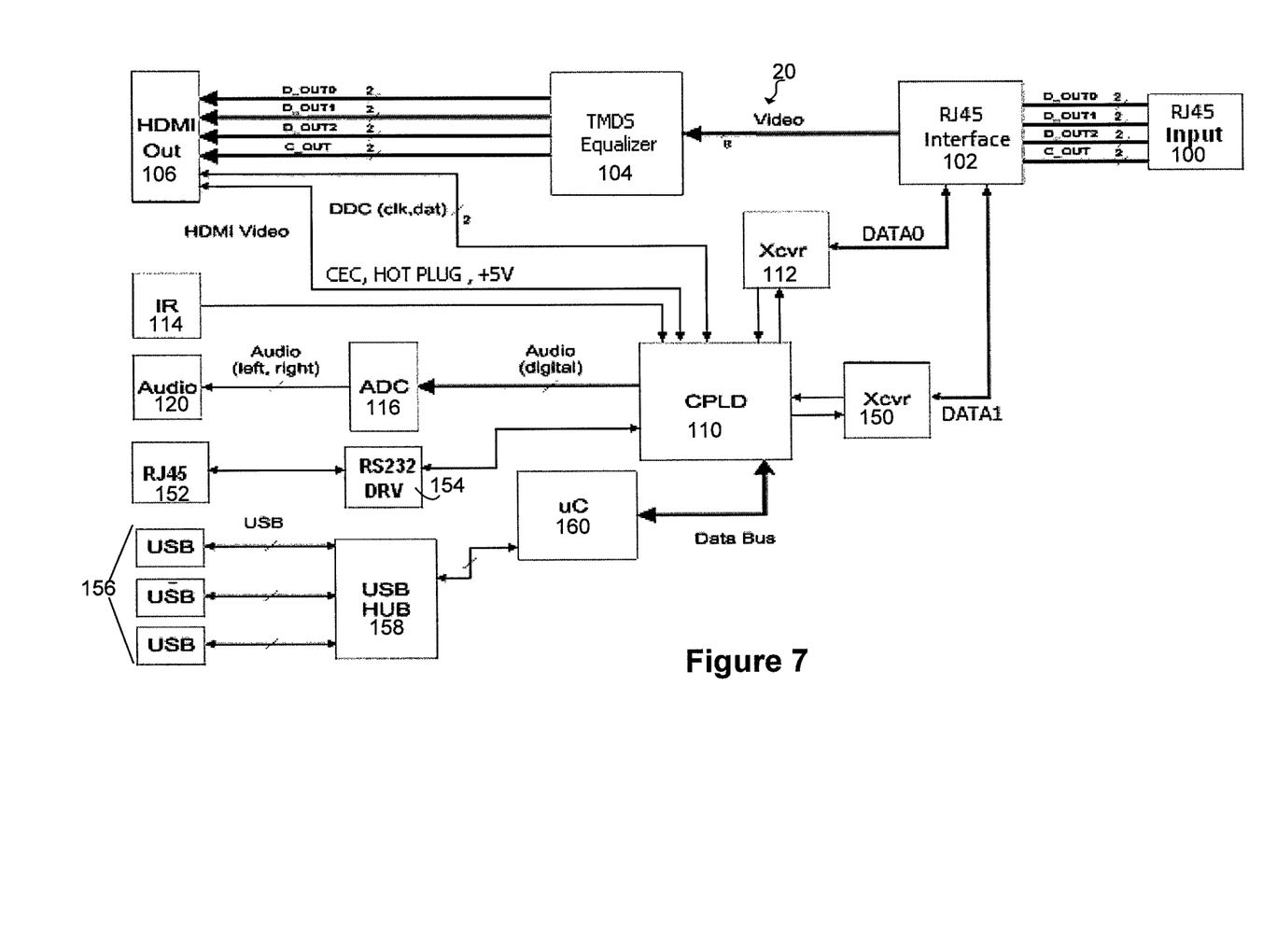
FIG. 7 is a schematic block diagram illustrating a second exemplary remote unit in accordance with aspects of the present invention.

Referring to FIGS. 6 and 7, a local unit 16 and a remote unit 20 are illustrated, respectively. The local unit 16 and the remote unit 20 are substantially similar to local unit 16 and remote unit 20 illustrated in FIGS. 2 and 5, respectively, except that circuitry for the exchange of emulated USB signals and RJ45 are also illustrated. For example, with respect to the local unit 16, a RJ45 port 130 and USB port 132 are also available. The RJ45 port 130 is coupled to a RS232 driver 134, which is coupled to the controller 44 to facilitate the exchange of RS232 data between the local unit 16 and the remote unit 20. Furthermore, USB port 132 is coupled to a USB HUB 136 which is coupled to a primary microcontroller 138 and a secondary controller 140. The controllers 138 and 140 are coupled to the controller 44 to facilitate the exchange of USB data between the local unit 16 and the remote unit 20. Furthermore, driver 48 (FIG. 2) is replaced with transceiver (142) to facilitate two-way data exchange.

Referring to the remote unit 20 illustrated in FIG. 7, a RJ45 port is coupled to a RS232 driver 154, which is coupled to the controller 110 to facilitate the exchange of RS232 data between the local unit 16 and the remote unit 20. USB ports 156 are coupled to a USB Hub 158 and microcontroller 160, which are ultimately controlled by the controller 110 to facilitate the exchange of information between the local unit 16 and the remote unit 20. The emulated USB signals are sent as described previously on the common mode of D2 and DCLK pairs and Stereo Audio and RS232 signals are sent in the same manner on the common mode of D0 and D1 pairs.

Figure 8:
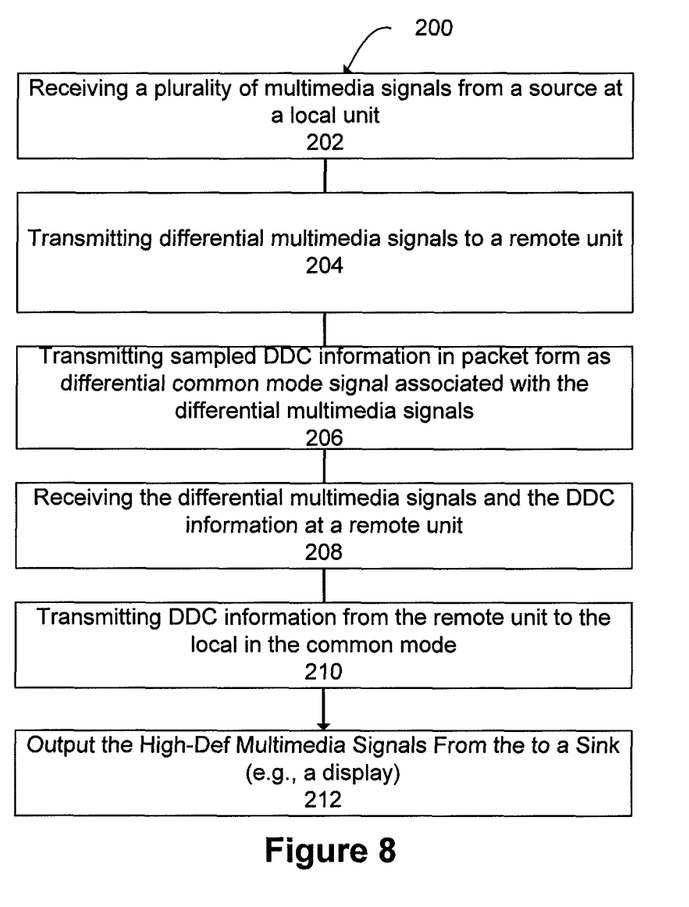
FIG. 8 is an exemplary method in accordance with aspects of the present invention.

An exemplary method 200 for extending high definition multimedia signals over a single twisted pair cable having a plurality of twisted pair conductor will now be discussed. High-definition content is generally protected by encoding/decoding the video signals according to the HDCP specification.

At power on, the local unit 16 will generally not present itself to the video source 12. Instead the hot plug input 32 will be kept low until communication with remote unit 20 is established and the sink is powered on at which moment the hot-plug signal is driven high. Upon power on, the EDID table is read via the DDC channel, as discussed above.

While the hot plug signal 32 is driven low the source 12 will not output TMDS video data to the local unit 16. The method 200 is described in general terms below and assumes that the necessary handshaking between the source 12 and the sink 24 have already occurred. Additional details regarding steps performed in method 200 are discussed above.

At block 202, a plurality of differential multimedia signals are received from a source 12 at the local unit 16. The multimedia signals may be HDMI or DVI signals, for example. HDMI signals generally include a plurality of video signals and a clock signal.

At block 204, the plurality of differential multimedia signals are transmitted to the remote unit 20.

At block 206, the data display channel (DDC) communication is established between the local unit 16 and the remote unit 20. The DDC information, which includes serial clock data and serial data, is sampled and transmitted in packet form at a rate sufficient to comply with high-bandwidth digital content protection (HDCP). The DDC information is then transmitted as a differential common mode signal corresponding to at least two of the plurality differential multimedia signals.

At block 208, the plurality of differential multimedia signals and the DDC information is received at the remote unit 20. The remote unit 20 generally decodes the received signals.

At block 210, the remote unit 20 transmits DDC information from the remote unit to the local unit. This is done over the common mode, as discussed above.

At block 212, the plurality of differential multimedia signals are output from the remote unit to an associated sink 24 (e.g., a display) based at least in part on the control information exchanged between the local unit and the remote unit.

While for purposes of simplicity of explanation, the methods illustrated herein include a series of steps or functional blocks that represent one or more aspects of the relevant operation of the extender 10, it is to be understood and appreciated that aspects of the present invention are not limited to the order of steps or functional blocks, as some steps or functional blocks may, in accordance with aspects of the present invention, occur in different orders and/or concurrently with other steps or functional blocks from that shown and described herein. Moreover, not all illustrated steps or functional blocks of aspects of relevant operation may be required to implement a methodology in accordance with an aspect of the invention. Furthermore, additional steps or functional blocks of aspects of relevant operation may be added without departing from the scope of the present invention.

Although aspects of the invention have described in the context of hardware circuitry, as used herein the term "circuitry" means hardware and/or software to perform a claimed function.

Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

What is claimed is:

1. A method for extending high definition multimedia signals over a single twisted pair cable medium having a plurality of twisted pair conductors, the method comprising:
   receiving a plurality of source differential multimedia signals and control information from a source at a local unit, wherein the plurality of source differential multimedia signals include a plurality of source video signals and a source clock signal;
   transmitting a plurality of local unit differential multimedia signals from the local unit to a remote unit, the plurality of local unit differential multimedia signals being based on the plurality of source differential multimedia signals, wherein the plurality of local unit differential multimedia signals include a plurality of local unit differential video signal pairs and a local unit differential clock signal pair;
   converting at least a portion of the control information into converted data display channel (DDC) information at the local unit for transmission to the remote unit, wherein the converted DDC information includes serial clock data and serial data that is sampled and transmitted in packet form at a rate sufficient to comply with high-bandwidth digital content protection (HDCP) and the converted DDC information is transmitted as a differential common mode signal;
   forming a first channel comprising a first pair of conductors and a second pair of conductors of the plurality of twisted pair conductors, wherein transmitting a plurality of local unit differential multimedia signals from the local unit to the remote unit comprises transmitting a first pair of local unit differential multimedia signals over the first pair of conductors and transmitting a second pair of local unit differential multimedia signals over the second pair of conductors;
   forming a second channel comprising a third pair of conductors and a fourth pair of conductors of the plurality of twisted pair conductors, wherein transmitting a plurality of local unit differential multimedia signals from the local unit to a remote unit comprises transmitting a third pair of local unit differential multimedia signals over the third pair of conductors and transmitting a fourth pair of local unit differential multimedia signals over the fourth pair of conductors, none of the local unit differential multimedia signals in the second channel being included in the local unit differential multimedia signals in the first channel;
   powering one of the local unit and the remote unit through the first and second channels, the first and second conductor pairs of the first channel being coupled to a first voltage and the third and fourth conductor pairs of the second channel being coupled to a second voltage, the second voltage being different than the first voltage;
   transmitting the converted DDC information as a common mode signal on the first channel;
   receiving the plurality of local unit differential multimedia signals and the converted DDC information at the remote unit;
   extracting the converted DDC information at the remote unit from the first channel;
   generating reconstructed DDC information at the remote unit from the converted DDC information;
   generating a plurality of remote unit differential multimedia signals at the remote unit based on the received plurality of local unit differential multimedia signals;
   transmitting return remote unit DDC information from the remote unit to the local unit over the first channel;
   outputting the plurality of remote unit differential multimedia signals and the reconstructed DDC information from the remote unit to an associated display based at least in part on the control information.

2. The method of claim 1, wherein the control information is sampled at the local unit and transmitted to the remote unit.

3. The method of claim 1, further comprising:
   converting additional data into additional differential common mode signals at the local unit for transmission to the remote unit;
   transmitting the additional differential common mode signals as a common mode signal on the second channel.

4. The method of claim 3, wherein the first and second pairs of local unit differential multimedia signals in the first channel include a first local unit differential video signal pair of the plurality of local unit differential video signal pairs and the local unit differential clock signal pair.

5. The method of claim 4, wherein the third and fourth pairs of local unit differential multimedia signals in the second channel include a second local unit differential video signal pair and a third local unit differential video signal pair of the plurality of local unit differential video signal pairs, the first, second and third local unit differential video signal pairs being different signals.

6. The method of claim 3, further comprising:
communicating differential common mode signals between the local unit and the remote unit over the first channel using a first local unit transformer in the local unit and a first remote unit transformer in the remote unit, each of the first local and remote unit transformers having a first side and a second side;
coupling local unit circuitry to the first side of the first local unit transformer for communicating differential signals at the local unit end, coupling one end of the second side of the first local unit transformer to the first pair of conductors of the first channel, coupling the opposite end of the second side of the first local unit transformer to the second pair of conductors of the first channel, and coupling a first local unit power terminal of the local unit to a center tap of the second side of the first local unit transformer;
coupling remote unit circuitry to the first side of the first remote unit transformer for communicating differential signals at the remote unit end, coupling one end of the second side of the first remote unit transformer to the first pair of conductors of the first channel, coupling the opposite end of the second side of the first remote unit transformer to the second pair of conductors of the first channel, and coupling a first remote unit power terminal of the remote unit to a center tap of the second side of the first remote unit transformer;
communicating differential common mode signals between the local unit and the remote unit over the second channel using a second local unit transformer in the local unit and a second remote unit transformer in the remote unit, each of the second local and remote unit transformers having a first side and a second side;
coupling the local unit circuitry to the first side of the second local unit transformer for communicating differential signals at the local unit end, coupling one end of the second side of the second local unit transformer to the third pair of conductors of the second channel, coupling the opposite end of the second side of the second local unit transformer to the fourth pair of conductors of the second channel, and coupling a second local unit power terminal of the local unit to a center tap of the second side of the second local unit transformer;
coupling the remote unit circuitry to the first side of the second remote unit transformer for communicating differential signals at the remote unit end, coupling one end of the second side of the second remote unit transformer to the third pair of conductors of the second channel, coupling the opposite end of the second side of the second remote unit transformer to the fourth pair of conductors of the second channel, and coupling a second remote unit power terminal of the remote unit to a center tap of the second side of the second remote unit transformer; and
powering both the local unit and the remote unit by connecting the first and second voltages directly to the first and second local unit power terminals or by connecting the first and second voltages directly to the first and second remote unit power terminals.

7. The method of claim 3, further including transmitting audio signals from the local unit to the remote unit over the first or second channel.

8. The method of claim 3, further including transmitting emulated universal serial bus data over the first or second channel.

9. The method of claim 3, further including transmitting RS-232 compatible data over the first or second channel.

10. The method of claim 3, further including transmitting stereo audio signals over the first or second channel.

11. The method of claim 1, further including changing DDC information received at the remote unit only when a DDC clock data is low.

12. The method of claim 3, further including transmitting infrared signals from the remote unit to the local unit over the first or second channel.

13. The method of claim 3, further including transmitting CEC signals over the first or second channel.

14. An extender for extending high definition multimedia signals over a single twisted pair cable medium having a plurality of twisted pair conductors, the extender comprising:
a local unit including:
a first local port for receiving high definition multimedia signals and source control information from a high definition video source, wherein the high definition multimedia signals include a plurality of video signals and at least one clock signal;
a second local port for receiving an associated twisted pair cable medium having a plurality of twisted pair conductors;
first local circuitry for generating a plurality of differential video signal pairs based on the high definition multimedia signals;
second local circuitry for converting at least a portion of the source control information into converted data display channel (DDC) information to be transmitted as a differential common mode signal, wherein the converted DDC information includes serial clock and serial data that is sampled and transmitted in packet form at a rate sufficient to comply with high-bandwidth digital content protection (HDCP);
third local circuitry for combining the converted DDC information with a first two differential video signal pairs of the plurality of differential video signal pairs on a first channel, and transmitting the DDC information as a differential common mode signal on the first channel and for transmitting a second two differential video signal pairs of the plurality of differential video signal pairs on a second channel out of the second local port over the associated twisted pair cable medium, the first channel comprising a first two conductor pair of the plurality of twisted pair conductors and the second channel comprising a second two conductor pairs of the plurality of twisted pair conductors of the associated twisted pair cable medium none of the twisted pair conductors of the second channel being part of the first channel;
a local unit power terminal coupled to the first two conductor pairs of the first channel; and
a local unit ground terminal coupled to the second two conductor pairs of the second channel;
a remote unit including:
a first remote port for receiving the associated twisted pair cable medium including the first and second channels, wherein the remote unit receives the plurality of differential video signal pairs and the differential common mode signal output from the local unit;
first remote circuitry for converting the plurality of differential video signal pairs into separate high definition multimedia signals at the remote unit;

second remote circuitry for extracting the converted DDC information from the differential common mode signal received at the remote unit on the first channel;

third remote circuitry for reconstructing the DDC information at the remote unit from the converted DDC information to provide display control information to the remote unit to comply with HDCP;

a remote unit power terminal coupled to the first two conductor pairs of the first channel; and a remote unit ground terminal coupled to the second two conductor pairs of the second channel;

a second remote port coupled to the first and third remote circuitry for outputting the separate high definition multimedia signals and the display control information to a video sink;

wherein power is provided to one of the local unit and the remote unit through the first and second channels by coupling first and second voltages to one of the local unit power and ground terminals or the remote unit power and ground terminals, the first and second voltages being different.

15. The extender of claim 14, wherein the twisted pair cable medium is an Ethernet cable.

16. The extender of claim 15, wherein the twisted pair cable medium is at least one selected from the group consisting of: a CAT 5 cable, a CAT 5e cable, a CAT 6 cable or a CAT 7 cable.

17. The extender of claim 14, wherein common mode communications between the local unit and the remote unit is conducted over the second channel.

18. The extender of claim 17, wherein the first channel exchanges the DDC information and the second channel exchanges audio information between the local unit and the remote unit.

19. The extender of claim 17, wherein the first or second channel is utilized to transmit USB data.

20. The extender of claim 17, wherein the first or second channel is utilized to transmit RS232 data.

21. The extender of claim 17, wherein the first or second channel is utilized to transmit infrared signals between the local unit and the remote unit.

22. The extender of claim 17, wherein the first or second channel is utilized to transmit CEC signals between the local unit and the remote unit.

23. The extender of claim 14, wherein a first coupler is utilized to couple the source to the local unit and a second coupler is utilized to couple the remote unit to the sink.

24. The extender of claim 23, wherein at least one of the first coupler or the second coupler is at least one selected from the group of an HDMI coupler or a DVI coupler.

25. The extender of claim 14, wherein the source is at least one selected from a group consisting of a DVD player, a Blue-ray player, a cable television set-top box, a satellite television set-top box or a computer.

26. The extender of claim 14, wherein the sink is at least one selected from a group consisting of a display or a monitor.

27. The extender of claim 17, wherein the third local circuitry comprises first and second local unit center tap transformers, and the second remote circuitry comprises first and second remote unit center tap transformers, each of the center tap transformers having a first side and a second side;

the first side of the first local unit center tap transformer being coupled to the second local circuitry for communicating differential signals over the first channel; and the second side of the first local unit center tap transformer having one end coupled to one conductor pair of the first two conductor pairs of the first channel, an opposite end coupled to the other conductor pair of the first two conductor pairs of the first channel, and a center tap coupled to the local unit power terminal;

the first side of the second local unit center tap transformer being coupled to the second local circuitry for communicating differential signals over the second channel; and the second side of the second local unit center tap transformer having a first end coupled to one conductor pair of the second two conductor pairs of the second channel, an opposite end coupled to the other conductor pair of the second two conductor pairs of the second channel, and a center tap coupled to the local unit ground terminal;

the first side of the first remote unit center tap transformer being coupled to the third remote circuitry for communicating differential signals over the first channel; and the second side of the first remote unit center tap transformer having a first end coupled to one conductor pair of the first two conductor pairs of the first channel, an opposite end coupled to the other conductor pair of the first two conductor pairs of the first channel, and a center tap coupled to the remote unit power terminal;

the first side of the second remote unit center tap transformer being coupled to the third remote circuitry for communicating differential signals over the second channel; and the second side of the second remote unit center tap transformer having a first end coupled to one conductor pair of the second two conductor pairs of the second channel, an opposite end coupled to the other conductor pair of the second two conductor pairs of the second channel, and a center tap coupled to the remote unit ground terminal.

28. The extender of claim 27, wherein a DC or an AC voltage is applied to one of the local and remote unit power terminals to power the local or remote unit via the first and second channels of the twisted pair cable medium.

* * * * *